United States Patent [19]
Gist et al.

[11] Patent Number: 5,898,513
[45] Date of Patent: Apr. 27, 1999

[54] CONSUMER INFRARED COMMUNICATIONS RECEIVER CARRIER FREQUENCY RANGE DETECTION CIRCUIT FOR AN INFRARED COMMUNICATIONS CONTROLLER

[75] Inventors: Ronald V. Gist, Central Islip; Jay D. Popper, Jamaica, both of N.Y.

[73] Assignee: Standard Microsystems Corp., Hauppauge, N.Y.

[21] Appl. No.: 08/802,335

[22] Filed: Feb. 11, 1997

[51] Int. Cl.$^6$ ............................. H04B 10/06; H04B 10/00
[52] U.S. Cl. ......................... 359/189; 359/142; 359/146; 359/172; 340/825.72; 348/734
[58] Field of Search ....................................... 359/142–143, 359/146, 152, 158, 172, 189; 340/825.72; 364/713; 348/734

[56] References Cited

U.S. PATENT DOCUMENTS

| | | | |
|---|---|---|---|
| 5,436,853 | 7/1995 | Shimohara | 359/142 |
| 5,617,236 | 4/1997 | Wang et al. | 359/172 |

OTHER PUBLICATIONS

Multi–Standard Infrared Transeiver—Crystal Semiconductor Corporation –1994.

*Primary Examiner*—Kinfe-Michael Negash
*Attorney, Agent, or Firm*—Hopgood, Calimafde, Kalil & Judlowe, LLP

[57] ABSTRACT

A circuit and method for detecting an edge of the carrier frequency of received data from a remote IR communications device by an Infrared Communications Controller is disclosed. During the receiving of IR signals from a remote IR communications device such as, for example, a TV, VCR or stereo, a frequency window of frequencies above and below a predetermined carrier frequency is opened. If the edge of the carrier frequency of the received data falls within the frequency window, communications are established between the IrCC and the remote IR communications device. If the negative edge of the carrier frequency of the received data does not fall in the frequency window of frequencies, then the system aborts communications. Provisions are made for a ten percent (10%), a twenty percent (20%) frequency window, and a forty percent (40%) frequency window. Other configurations combining various percentage frequency windows are also disclosed as well as methods for generating the frequency windows.

19 Claims, 8 Drawing Sheets

| ADDRESS | | | DIRECTION | DESCRIPTION | | | | | | | | DEFAULT |
|---|---|---|---|---|---|---|---|---|---|---|---|---|
| A2 | A1 | A0 | | D7 | D6 | D5 | D4 | D3 | D2 | D1 | D0 | |
| 0 | 0 | 0 | R/W | CONSUMER IR (TV REMOTE) CONTROL REGISTER | | | | | | | | '00'HEX |
| | | | | SYNC BIT | | | | | CARRIER OFF | CARRIER RANGE BITS | | |
| 0 | 0 | 1 | R/W | CONSUMER IR CARRIER RATE REGISTER | | | | | | | | '29'HEX |
| 0 | 1 | 0 | R/W | CONSUMER IR BIT RATE REGISTER | | | | | | | | '37'HEX |
| 0 | 1 | 1 | | | | | | | | | | |
| 1 | 0 | 0 | | | | | | | | | | |
| 1 | 0 | 1 | | | | | | | | | | |
| 1 | 1 | 0 | | | | | | | | | | |
F I G. 5
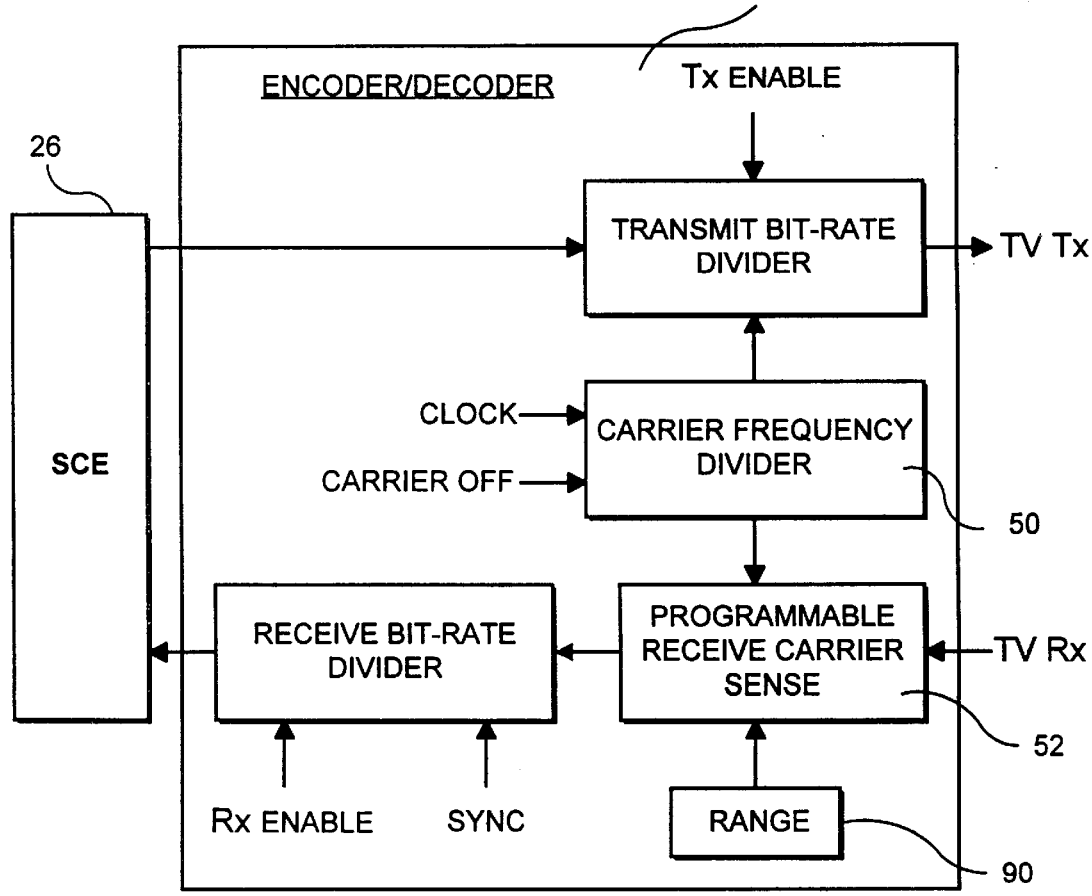
F I G. 6

REPRESENTATIVE CARRIER FREQUENCIES

| CFD | Fc(KHz) | CFD | Fc(KHz) | CFD | Fc(KHz) | CFD | Fc(KHz) |
|-----|---------|-----|---------|-----|---------|-----|---------|
| 001 | 800.000 | 065 | 24.242  | 129 | 12.308  | 193 | 8.247   |
| 005 | 266.667 | 069 | 22.857  | 133 | 11.940  | 197 | 8.081   |
| 009 | 160.000 | 073 | 21.622  | 137 | 11.594  | 201 | 7.921   |
| 013 | 114.286 | 077 | 20.513  | 141 | 11.268  | 205 | 7.767   |
| 017 | 88.889  | 081 | 19.512  | 145 | 10.959  | 209 | 7.619   |
| 021 | 72.727  | 085 | 18.605  | 149 | 10.667  | 213 | 7.477   |
| 025 | 61.538  | 089 | 17.778  | 153 | 10.390  | 217 | 7.339   |
| 029 | 53.333  | 093 | 17.021  | 157 | 10.127  | 221 | 7.207   |
| 033 | 47.059  | 097 | 16.327  | 161 | 9.877   | 225 | 7.080   |
| 037 | 42.105  | 101 | 15.686  | 165 | 9.639   | 229 | 6.957   |
| 041 | 38.095  | 105 | 15.094  | 169 | 9.412   | 233 | 6.838   |
| 045 | 34.783  | 109 | 14.545  | 173 | 9.195   | 237 | 6.723   |
| 049 | 32.000  | 113 | 14.035  | 177 | 8.989   | 241 | 6.612   |
| 053 | 29.630  | 117 | 13.559  | 181 | 8.791   | 245 | 6.504   |
| 057 | 27.586  | 121 | 13.115  | 185 | 8.602   | 249 | 6.400   |
| 061 | 25.806  | 125 | 12.698  | 189 | 8.421   | 253 | 6.299   |

REPRESENTATIVE BIT RATES

| BRD | Fb(KHz) | BRD | Fb(KHz) | BRD | Fb(KHz) | BRD | Fb(KHz) |
|-----|---------|-----|---------|-----|---------|-----|---------|
| 003 | 25.000  | 067 | 1.471   | 131 | 0.758   | 195 | 0.510   |
| 007 | 12.500  | 071 | 1.389   | 135 | 0.735   | 199 | 0.500   |
| 011 | 8.333   | 075 | 1.316   | 139 | 0.714   | 203 | 0.490   |
| 015 | 6.250   | 079 | 1.250   | 143 | 0.694   | 207 | 0.481   |
| 019 | 5.000   | 083 | 1.190   | 147 | 0.676   | 211 | 0.472   |
| 023 | 4.167   | 087 | 1.136   | 151 | 0.658   | 215 | 0.463   |
| 027 | 3.571   | 091 | 1.087   | 155 | 0.641   | 219 | 0.455   |
| 031 | 3.125   | 095 | 1.042   | 159 | 0.625   | 223 | 0.446   |
| 035 | 2.778   | 099 | 1.000   | 163 | 0.610   | 227 | 0.439   |
| 039 | 2.500   | 103 | 0.962   | 167 | 0.595   | 231 | 0.431   |
| 043 | 2.273   | 107 | 0.926   | 171 | 0.581   | 235 | 0.424   |
| 047 | 2.083   | 111 | 0.893   | 175 | 0.568   | 239 | 0.417   |
| 051 | 1.923   | 115 | 0.862   | 179 | 0.556   | 243 | 0.410   |
| 055 | 1.786   | 119 | 0.833   | 183 | 0.543   | 247 | 0.403   |
| 059 | 1.667   | 123 | 0.806   | 187 | 0.532   | 251 | 0.397   |
| 063 | 1.563   | 127 | 0.781   | 191 | 0.521   | 255 | 0.391   |

CONSUMER INFRARED COMMUNICATIONS RECEIVER CARRIER FREQUENCY RANGE DETECTION CIRCUIT FOR AN INFRARED COMMUNICATIONS CONTROLLER

RELATED APPLICATIONS

This application is related to U.S. patent application Ser. No. 08/766,496, filed Dec. 13, 1996, the disclosure of which is herein incorporated by reference.

BACKGROUND OF THE INVENTION

The present invention is related generally to Infrared Communications Controllers (IrCC) for use with devices, such as, for example, personal computers, more particularly to an IrCC consumer IR (TV remote) for general-purpose programmable Amplitude Shift Keyed serial communications interface that includes a carrier frequency divider, a programmable receive carrier divider, a range sensitivity register and receive demodulator and transmit modulator and, most particularly, to a Consumer Infrared Communications receiver carrier frequency range detection circuit and method.

An IrCC typically comprises two main architectural units, a uniform asynchronous receiver/transmitter (UART) and a synchronous communications engine (SCE). Each unit is supported by its own unique register set.

In infrared communications controllers utilized with personal computers, the IrCC is usually incorporated into a semiconductor chip. When designing a semiconductor chip, there is considerable competition between the available resources or space on the chip and the ever increasing functions required to be accomplished by the applications with the limited physical size of the chip. Specifically, only recently on a chip of silicon roughly an inch square, Intel®'s Pentium® chip held about three (3) million transistors, or tiny electronic switches. More recently, the number of transistors on the same inch square chip has been increased to between five (5) and six (6) million. Thus, while the number of transistors or electronic switches that can be implemented on a chip have increased, so has the number of functions that auxiliary chips, which communicate with the CPU are required to perform. Given this constant need for increased functions, chip designers are constantly looking for ways to decrease the amount of space, i.e., the number of electronic switches in a chip required to do a specific function.

Over the past fifteen (15) years, the tools required to manage growing communication needs have expanded. Unfortunately, the physical act of communicating hasn't always been simplified. An example of the complexity of communicating involves the transfer of data from a notebook computer to a laser printer. This seemingly simple task requires that the mobile PC be connected by a cable to a printer. Alternatively, the data contained on the notebook computer could be saved to a diskette and then inserted into a desktop computer, the data being accessed by an application on the desktop and then the data is printed on the printer. Either of these procedures is generally time consuming.

Recently, personal computer (PC) manufacturers or PC developers have produced personal computers having ports for communicating data to and from input/output devices via wireless infrared signals. Infrared radiation is very directional and generally is most effective when the infrared transmitting device is aligned within fifteen (15°) degrees left or right of the receiving IR port.

The infrared transmitting device encodes data and sends it via infrared signal to the receiving device, where it is decoded, operating much the same as a modem without wires. By using the software for infrared use, the system notifies the user when it "sees" another IrDA-equipped device. Once another infrared-equipped device is "found," the files to transmit are selected and the process initiated. The line of sight must be unobstructed between the transmitting device and the receiving device, since infrared radiation will not pass through or around people or things.

Recently, IBM® included an infrared communications port in the Think Pad® notebook computer to facilitate point-to-point communications with other Think Pad® computers or systems equipped with an infrared port. The IR port is located on the rear or side of the computer. Each of the IR data ports supports the new IrDA (infrared data association) standard which enables short-range, point-to-point wireless interconnection of computers and peripherals without cabling. The adapters created visible links between computers and computer peripherals equipped with similar technology. Instead of physical attachment by means of cables attached to a computer's serial or parallel port, these infrared ports make a quick and easy connection through the use of infrared radiation.

In TV remote infrared control, IR signals are typically transmitted from the remote control to the TV, VCR or stereo and software converts the signals from the encoders in the remote control into digital instructions to change channels, raise or lower the sound volume, etc. This requires that the transceivers be incorporated in both the remote control and the TV, VCR, or stereo. Recently, personal computer designers have moved toward incorporating more infrared communication functions into the PC including the Consumer IR (TV Remote) control function. With many infrared communication functions being incorporated into PCs, the use of wireless infrared communications has become more important.

Once the decision was made to include the Consumer IR (TV Remote) function in a PC, it became necessary to determine effective means for tuning the receive portion of the PC receiver for tolerances around the absolute frequency transmitted from the transceiver for a wide range of programmable frequencies. This discrimination or frequency checking function should be accomplished in a way that conserves chip space while providing for the rapid and accurate establishments of IR communications between the PC and the remote IR communications device.

Thus, there is a need for a Consumer IR TV remote function in an Infrared Communications Controller of a personal computer that effectively tunes in the IR receiver for each tolerance around the absolute frequency that is being sent from the other transceiver. Such a Consumer IR TV remote function should include a carrier frequency range detection circuit that performs the receiver/discriminator function within the Consumer IR portion of the Infrared Communications Controller. This receiver/discriminator function should require as little chip space as possible while rapidly and effectively establishing IR communications with the remote IR communications device.

SUMMARY OF THE INVENTION

It is accordingly an object of the present application to provide a new, improved, carrier frequency range detection circuit and method for an Infrared Communications Controller (IrCC) such that IR communication between a PC, having an IrCC, and a remote IR communications device is rapidly and accurately established.

Another object of the present application is to provide a circuit and method to implement rapid, accurate IR communications between a PC and a TV, a VCR or a stereo that occupies as little space as possible in the IrCC chip.

Still another object of the present application is to provide a circuit and method that effectively checks the carrier frequency of the data being received by the PC from a remote IR communications device by detecting an edge of the carrier frequency of the received data.

Another object of the present application is to provide a circuit and method for generating a window including carrier frequencies a certain percentage above and below the carrier frequency determined by the PC as being transmitted by a remote IR communications device.

The present application achieves the above objects by providing, in one embodiment, an infrared communications controller comprising: UART means; synchronous communications engine (SCE) means; clock generator means; a plurality of register means; bus interface input/output means; encoder/decoder means, for communicating with the clock generator means, the bus interface input/output means, the register means, and the SCE means; an output multiplexor, operatively connected to the encoder/decoder means, for communication with an IR transducer module, a communications port and an auxiliary port; and a receiver carrier frequency range detection circuit including a window generator means, the window generator means comprising: a carrier frequency edge detection means; a carrier frequency divider means including a programmable sense range divider means, operatively connected to the edge detection means, for dividing a received carrier frequency; and a range sensitivity register, operatively connected to the programmable sense range divider means, for generating a predetermined window of carrier frequencies around a programmed carrier frequency.

Another embodiment of the present invention includes a receiver carrier frequency range detection circuit including a window generator means for use with an IrCC, the window generator means comprising: a carrier frequency edge detection means; a carrier frequency divider means including a programmable sense range divider means, operatively connected to the edge detection means, for dividing a received carrier frequency; and a range sensitivity register, operatively connected to the programmable sense range divider means, for generating a predetermined window of carrier frequencies around a programmed carrier frequency.

One method includes a method for determining whether a carrier frequency being received is the same as a programmed carrier frequency, the method comprising the steps of: detecting an edge of the received carrier frequency; generating a window having a predetermined range of frequencies above and below the programmed carrier frequency; and if the edge of the received carrier frequency falls within the predetermined range, process the received carrier frequency.

Other objectives and advantages of the present application will become apparent from the following description, the accompanying drawings and the appended claims.

BRIEF DESCRIPTION OF THE DRAWINGS

FIG. 5 is a table illustrating register block 2 of the SCE register containing the consumer IR (TV Remote) encoder/decoder configuration registers utilized in the Infrared Communications Controller of the present application;

FIG. 6 is a block diagram of the Infrared Communications Controller Consumer IR (TV Remote) block of the Infrared Communications Controller of the present application;

DETAILED DESCRIPTION OF THE INVENTION

Figure 1:
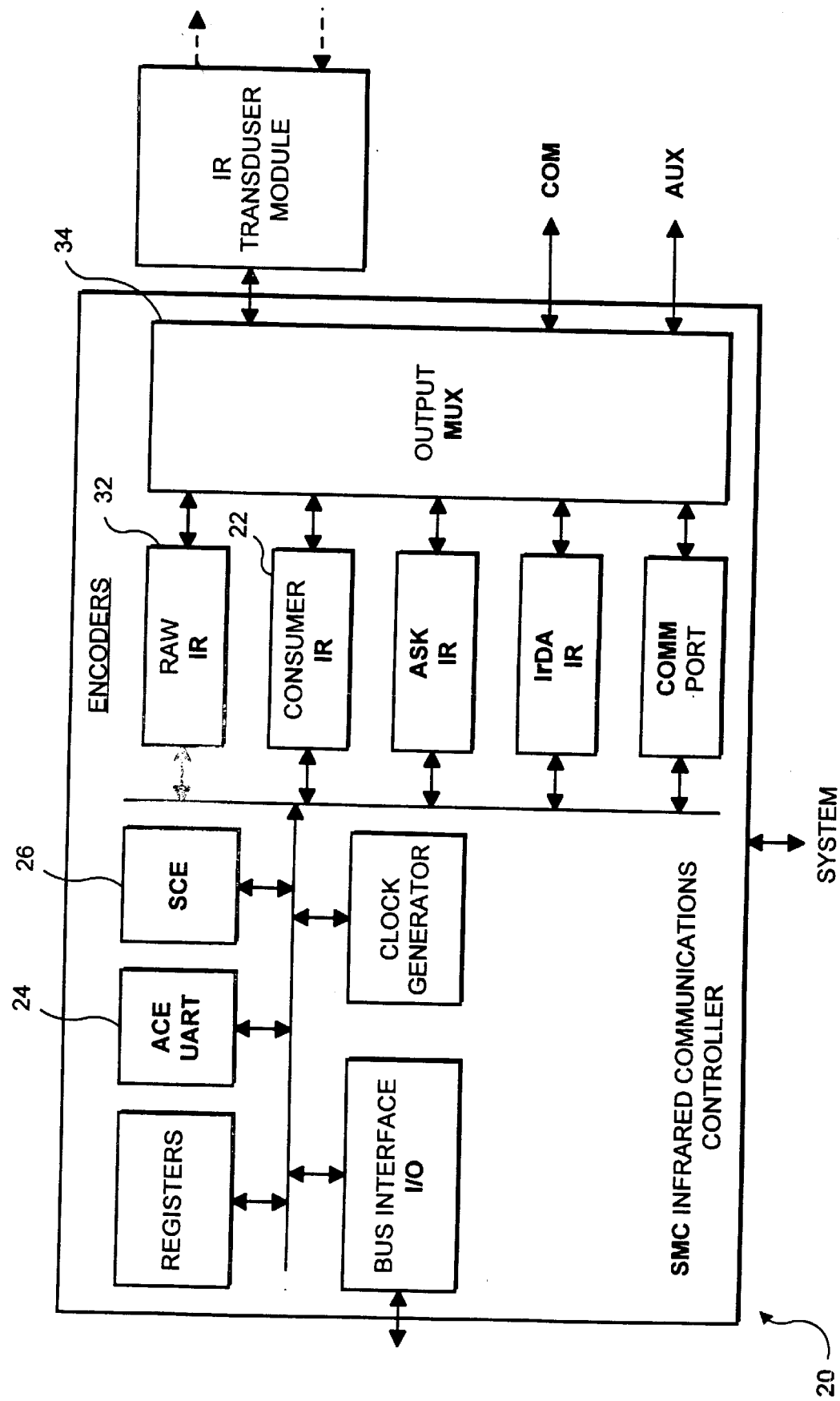
FIG. 1 is a functional block diagram illustrating the serial port logic of an Infrared Communication Controller incorporating Consumer IR with the receiver carrier frequency range detection circuit and method of the present application.
Figure 2:
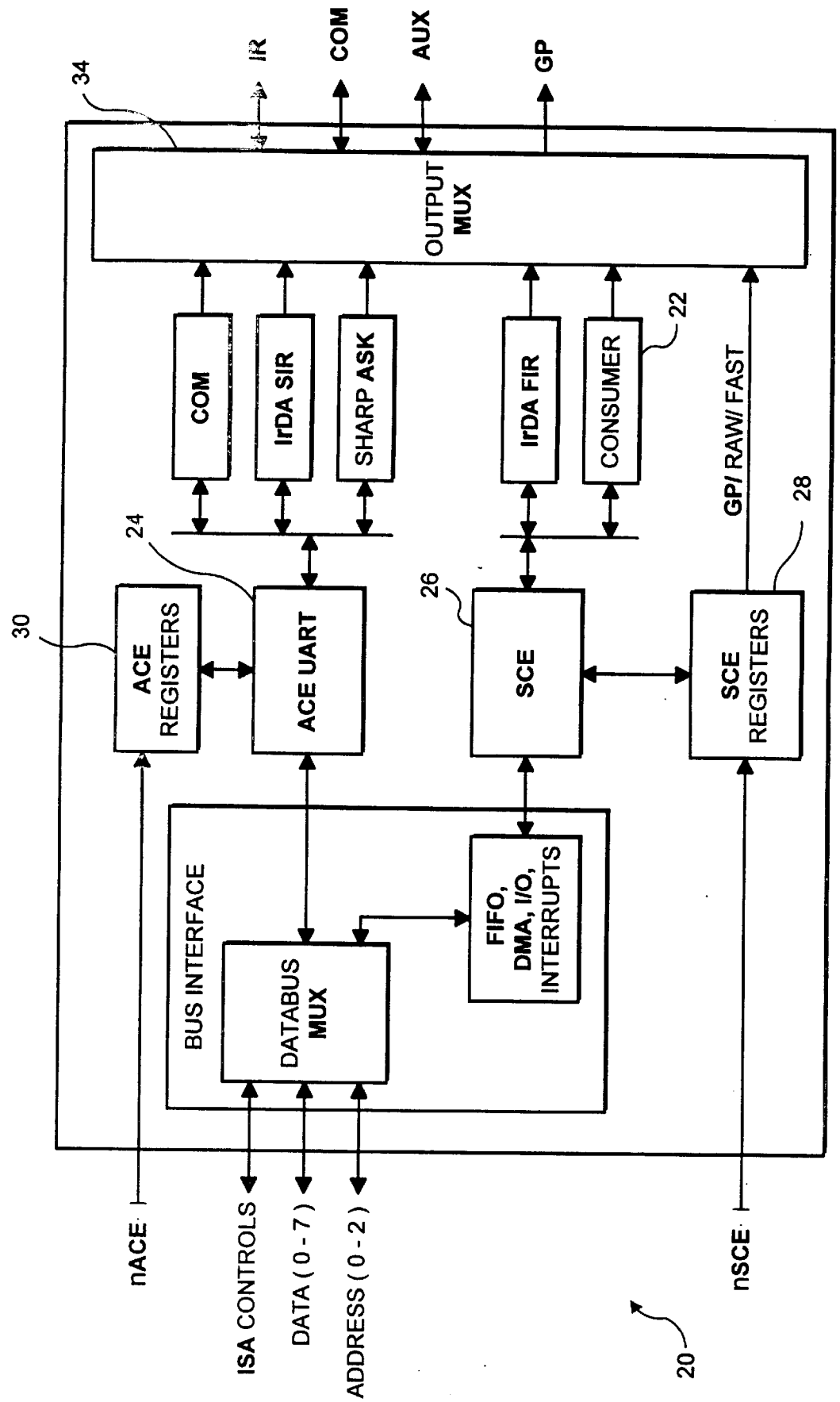
FIG. 2 is an architectural block diagram illustrating the serial port logic of an infrared communications controller incorporating Consumer IR with the receiver carrier frequency range detection circuit and method of the present application.

The Infrared Communications Controller (IrCC) 20, which incorporates the consumer IR carrier frequency range detection circuit 22 of the present application, comprises a Uniform Asynchronous Receiver/Transmitter (UART) 24 and a Synchronous Communications Engine (SCE) 26, each having its own unique register sets 28, 30. The IrCC 20 offers flexible signal routing and programmable output control through the Raw IR Mode Interface 32, General Purpose Data pins and Output Multiplexor 34. Chip-Level address decoding is required to access the IrCC register sets. FIG. 1 illustrates the IrCC functional components and FIG. 2 illustrates its architectural block diagram.

Figure 3:
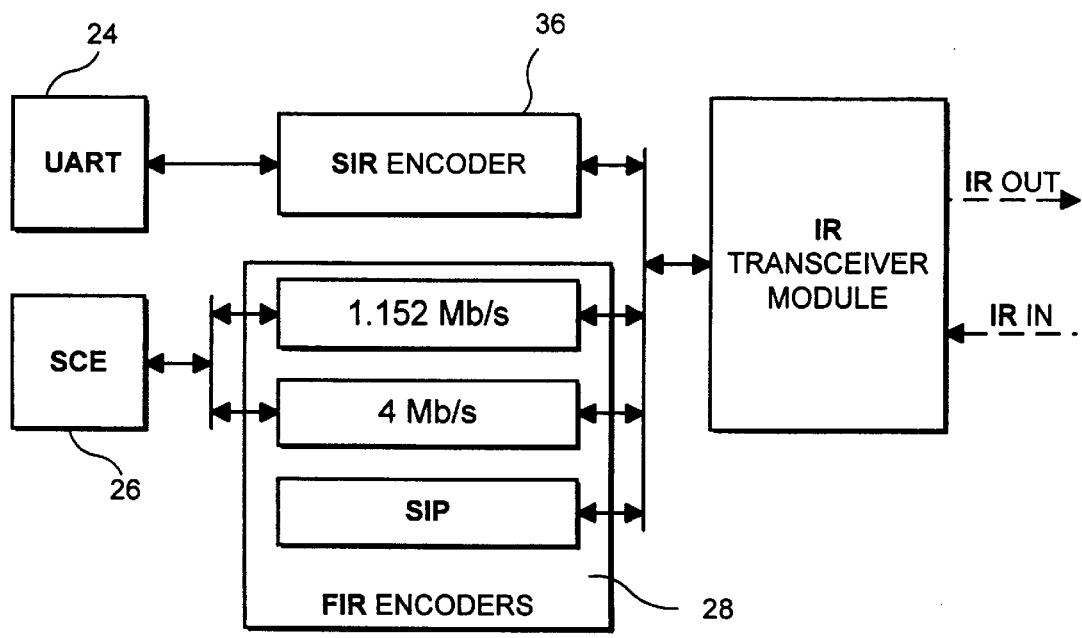
FIG. 3 is a block diagram of one end of an Infrared Data Association (IrDA) link including the SIR and FIR physical implementation as utilized in the Infrared Communications Controller of the present application.

The Infrared Data Association (IrDA) was created to develop an inter-operable, low-cost, low-power, half-duplex serial data inter-connection standard that supports a walkup, point-to-point user model that is adaptable to a wide range of appliances and devices. The high-speed extensions (FIR) to the IrDA physical layer appear as alternate modulation and demodulation paths for data from SIR-Link Access Protocol (IrLAP) bound for the Infrared (IR) median and are transparent to IrLAP as it is defined for Serial Infrared (SIR). A block diagram of one end of an IrDA link that includes the SIR 36 and FIR 38 physical implementations, as shown in FIG. 3.

As shown, the SIR Interaction Pulse (SIP) is intended to guarantee non-disruptive coexistence with SIR-only systems that otherwise might interfere with Fast IR links. A SIP is defined as a 1.6 microsecond transmitter on pulse followed by a 7.1 microsecond of off time. Once a Fast connection has been established, the station will generate one SIP about every 500 milliseconds (ms).

The details of the Infrared Communications Controller that incorporates the Consumer IR receiver carrier frequency range detection circuit and methods incorporating a frequency window generator is described in a document entitled, Infrared Communications Controller by Standard Microsystems Corporation, 300 Kennedy Drive, Hauppauge, N.Y. 11788 and is identified as IrCC Rev. May 10, 1996, the disclosure of which is incorporated herein by reference.

The IrCC 20 utilized with the Consumer IR function and the receiver carrier frequency range detection or discriminator circuit 22 conforms to the IrDA IR Link Management Protocol (IRLMP), the Infrared Data IrDA Infrared (IR) Link Access Protocol IrLAP and the fast (FIR) extensions to the IrDA physical layer link specification in that the IrCC encodes/transmits and receives/decodes synchronous serial data organized in a specific format called a frame at 0.576 Mbps rate, 1.152 Mbps rate or at the 4 Mbps rate.

Figure 4:
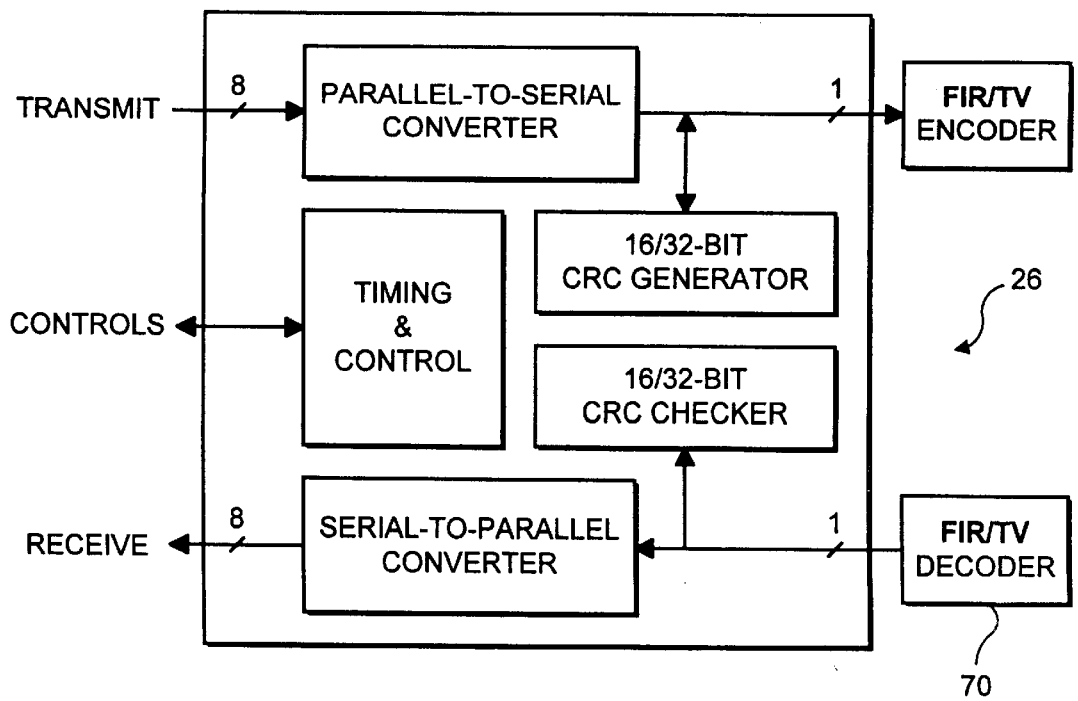
FIG. 4 is a block diagram illustrating the Synchronous Communications Engine (SCE) of the Infrared Communications Controller of the present application.

The SCE 26 is a half-duplex synchronous serial communication controller that controls data flow between the Bus interface I/O block in IrDA FIR and Consumer IR (TV remote) encoders, see FIG. 4. The SCE 26 also includes partial full-duplex loopback functionality for diagnostics testing. Bit rates from 0.4 kbps to 4 mbps are supported. All of the SCE register controls are located in the nSCE-addressable 8-bit register blocks. In the presently preferred embodiment, the SCE 26 operates with and without framing. Operating with framing implies that the SCE 26 works with the IrDA FIR encoder/decoder 38 so the required symbols from the non-payload data portions of the of the 0.576 Mbps, 1.152 Mbps and 4 Mbps packets can be generated. Operating without framing, the SCE is a serial-to-parallel converter for the consumer IR (TV remote) encoder/decoder 40.

The SCE signal nAcitiveFrame is a PLA state variable that is synchronized to both IrDA FIR consumer IR message frames. The nActiveFrame signal cycles high and low for each message frame, regardless of the state of the Brick Wall bit. The nActiveFrame signal is primarily used to trigger active frame interrupts and to advance the message count bits that control hardware access to the line status registers. In the consumer IR mode, during transmit, the nActive-Frame signal goes active when the consumer IR transmitter starts modulating the SCE data stream. The nActiveFrame becomes inactive when the transmit register is empty. In the receive mode, the nActiveFrame signal goes active when the consumer IR receiver detects the first active bit-time of infrared energy. The nActiveFrame becomes inactive whenever the consumer IR receiver is manually disabled, a DMA terminal count has occurred, or following a FIFO overrun.

The Consumer IR (TV Remote) portion 22 of the IrCC 20 is a general-purpose programmable Amplitude Shift Keyed (ASK) serial communications interface that includes a carrier frequency divider 50, a programmable receiver carrier range sensitivity register 52 and receive and transmit modulators, as shown in FIG. 6. The consumer IR portion transfers data between the SCE 26 and the output multiplexor 34 without framing as a fixed bit-cell serial non return to zero (NRZ) data stream. The components of this portion of the IrCC can also modulate and demodulate serial data at programmable bit rates and carrier frequencies.

Register controls for this portion of the IrCC are found in register block 2 of the SCE register, see FIG. 5. The register's controls are the consumer IR control register 54, the Consumer IR carrier rate register 56 and the consumer IR bit rate register 58.

Figures 9, 11:
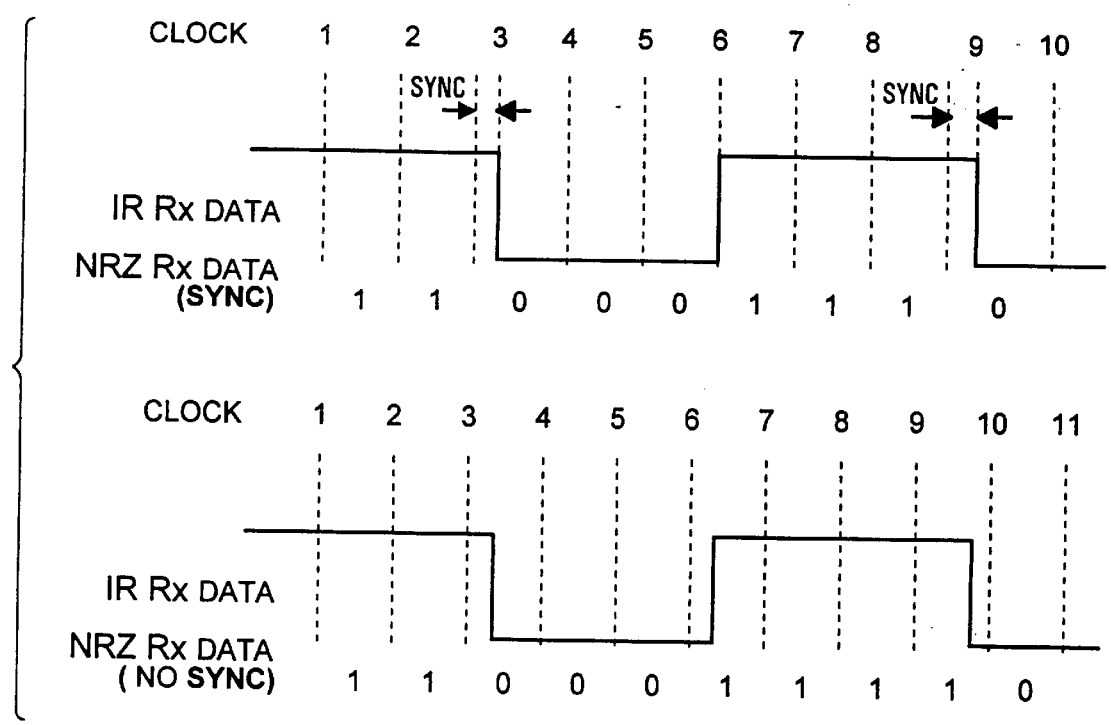
FIG. 9 is a table illustrating the relationships between the bit rate divider and the bit rate utilized in the Infrared Communications Controller of the present application.
FIG. 11 is a graphical illustration of the receiver bit cell synchronization mechanism utilized by the Infrared Communication Controller of the present application to sample the signal level in the center of each coming bit period.
Figures 10, 13:
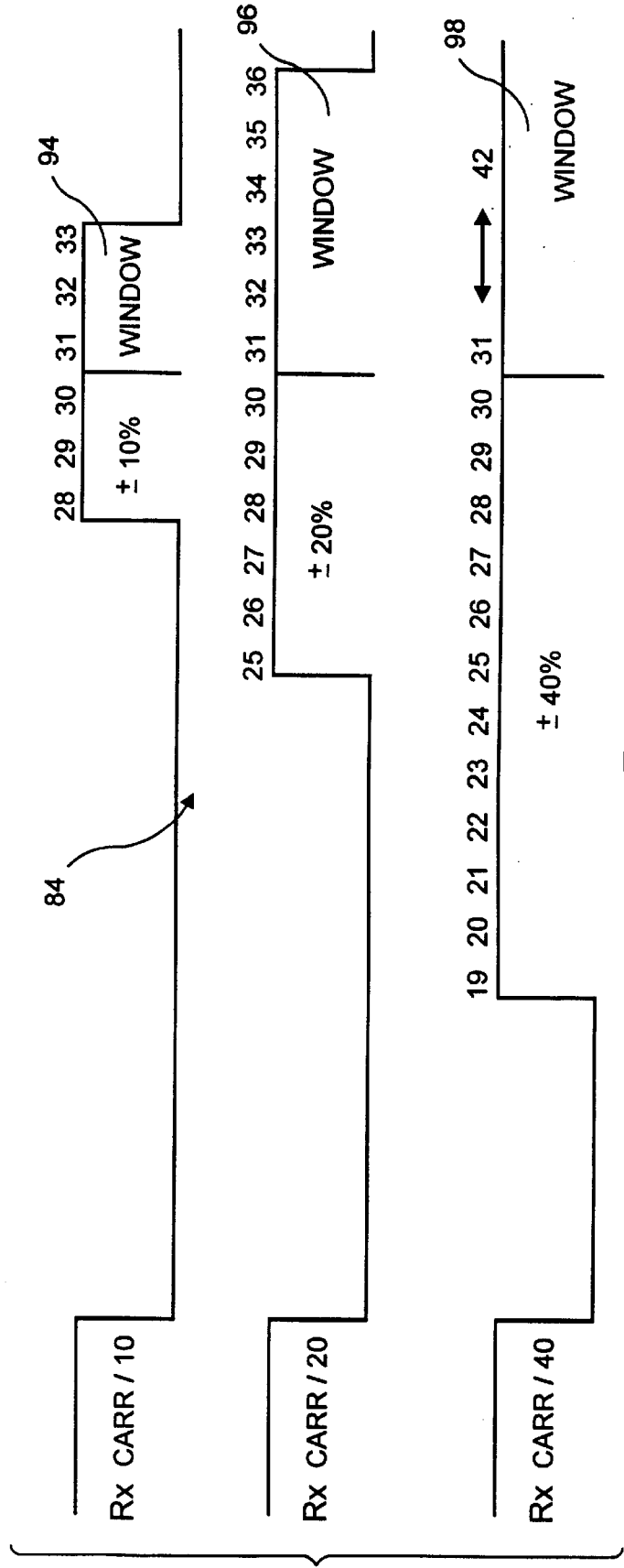
FIG. 10 is a table illustrating the range values for the programmable receive carrier sense register used to program the consumer IR decoder and detect the presence of IR energy in a wide-to-narrow range of carrier frequencies utilized in the Infrared Communications Controller of the present application.
FIG. 13 is a schematic representation of a ten percent (10%), a twenty percent (20%) window, and a forty percent (40%) window as generated by the carrier frequency window generator incorporated in the Infrared Communications Controller of the present application.

Register block 2 of the IrCC of the present application contains the consumer IR (TV remote) encoder/decoder configuration tables, as shown in FIG. 5. The Sync bit 60, bit 7, enables the receiver bit-rate clock synchronization mechanism, see FIG. 11. When the Sync bit 60 is 1, receiver edge synchronization is enabled. The carrier off bit 62, bit 2, bypasses the consumer IR carrier frequency generator/receiver. When the carrier off bit 62 is 1, the transmitter outputs a nonmodulated NRZ serial data stream at the programmed bit rate. Also, when the carrier off bit 62 is 1, the receiver does not attempt to demodulate a carrier frequency from the incoming data stream and samples the state of the PIN diode at the programmed bit rate. The consumer IR carrier range bits 64, bits 0–1, set the carrier detect sensitivity of the receiver. The effects of this register (address 1) are shown in FIG. 10.

Figures 7, 8:
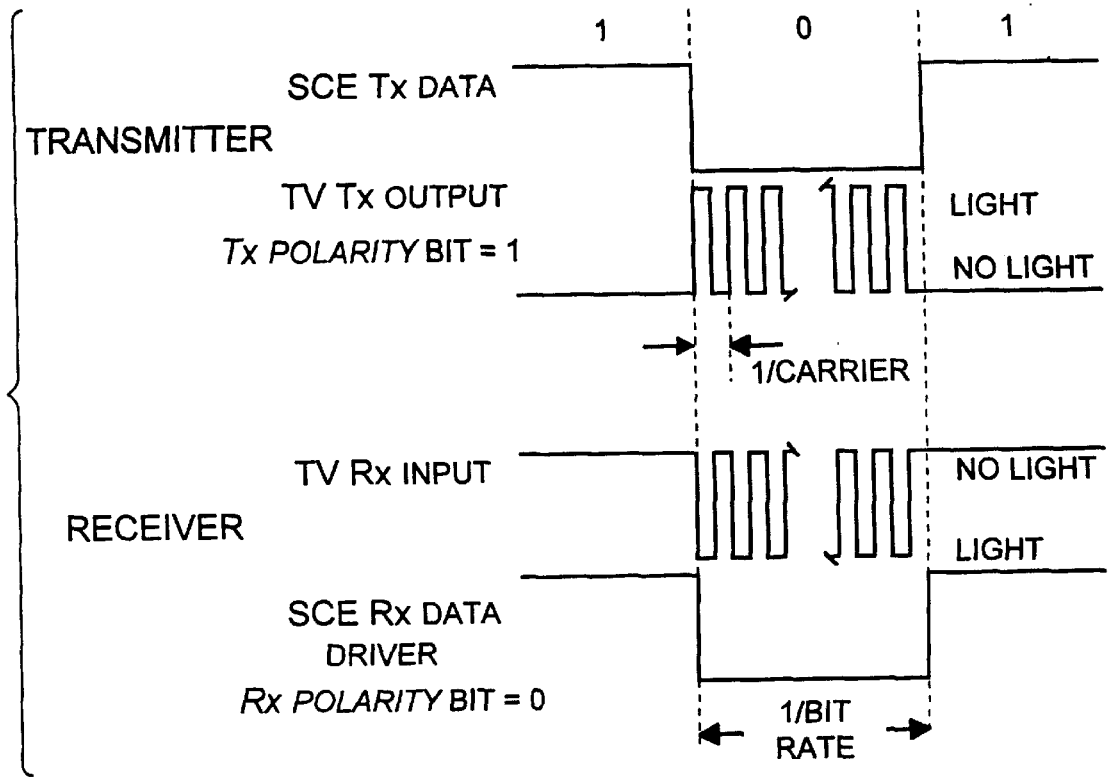
FIG. 7 is a graphical illustration of the carrier frequency divider register used to program the ASK carrier frequency for the transmit modulator and receive detector of the Infrared Communications Controller of the present application.
FIG. 8 is a table illustrating representative carrier frequency divider versus carrier frequency relationships utilized in the Infrared Communications Controller of the present application.

The Consumer IR carrier register rate programs the ASK carrier frequency divider 50. The effects of this register are shown in FIG. 8. The consumer IR bit rate register 58 (address 2) programs the transmit and receive bit-rate divider. The effects of this register are shown in FIG. 9.

The carrier frequency divider register 56 is used to program the ASK carrier frequency for the transmit modulator and receive detector, as shown in FIG. 7. The divider is eight (8) bits wide. The input clock to the carrier frequency divider is 1.6 MHZ (48 MHZ/30), for example. At the example carrier frequency, the relationship between the carrier frequency divider value (CFD) and the carrier frequency (Fc) is as follows:

$$CFD = (1.6 \text{ MHZ}/Fc) - 1$$

For example, the carrier frequency divider register 56 is programmed with 41 ('29'Hex) for a 38 KHz TV remote (Fc=38.095 KHz). This is about a 0.25% accuracy. FIG. 8 illustrates representative carrier frequency divider (CFD) versus carrier frequency (Fc) relationships.

The Carrier Frequency range is 1.6 MHZ to 6.25 KHz. The Carrier Frequency encoder/decoder 26 can be defeated using the carrier off bit 62, see FIG. 5. When the carrier off bit 62 is 1, the transmitter outputs a non-modulated serial NRZ data stream at the programmed bit rates, and the receiver does not attempt to demodulate a carrier frequency from the incoming serial data stream from the remote IR communications device.

The transmit and receive bit rate divider register is used to control the serial NRZ data stream of the IrCC CIR. This divider is eight (8) bit wide. The input clock to the bit rate divider is 100 KHz (carrier frequency divider input clock/16). The relationship between the bit rate divider (BRD) and the bit rate (Fb) is as follows:

$$BRD = (0.1 \text{ MHZ}/Fb) - 1$$

For example, the bit rate divider 58 is programmed with 55 ('37'HEX) (see FIG. 5) for a 0.562 ms TV Remote regular bit cell: Fb=1.786 KHz. This is about a 0.5% accuracy. FIG. 9 illustrates representative Bit Rate Divider (BRD) versus bit rate relationships. As used in this example, the bit rate (fb) range is 100 KHz to 390.625 Hz.

The programmable receive carrier sense register 52 (see FIGS. 6, 7 and 12) is used to program the consumer IR decoder 70 to detect the presence of IR energy in a wide-to-narrow range of carrier frequencies and the register is 2 bits wide. The range values are shown in FIG. 10. Carrier frequencies that fall outside the receiver carrier frequency range sensitivity will "abort" the message, i.e., the abort bit is set, and end of message (EOM) interrupt is generated and the receiver is disabled. If the "Carrier Off" bit 62 is active (see FIG. 5), the receive carrier range sensitivity 52 is disabled.

The consumer IR receiver demodulates incoming ASK waveforms into NRZ data for the SCE 26. The IrCC 20 uses the edges of the demodulated incoming infrared data to indicate changes in bit state.

For continuous periods of high or low data without transitions, the IrCC 20 samples the signal level in the center of each incoming bit. Using the receiver bit cell and synchronization mechanism, any transition resets the timer that is used in the sampling process to eliminate errors due to timing differences between the receive decoder and the incoming bit, as shown in FIG. 11.

Receiver synchronization can be disabled to allow direct sampling of the demodulated incoming infrared data stream at some preset receive bit rate. This is useful in situations where the speed of the received data is not strictly known. In such cases, the received data bit rate is set as high as possible, the receiver bit cell synchronization is disabled, and the systems software is used to measure the bit-cell from the oversampled data. The learned parameters can then be used to switch to the synchronized, fixed bit-cell mode to reduce processing time in the host CPU (not shown) for all future transactions between the IrCC 20 and the remote IR device (not shown).

When the IrCC 20 is in the Consumer Infrared Communication (CIR) mode, there is no way, without the receiver carrier frequency range detection circuit 22 and method including a frequency window generator 80, for determining if the carrier frequency received is the programmed or expected carrier frequency. As long as data is being received by the IrCC 20, the data that is received may be incompatible or bad data and the system may not recognize that it is incompatible or bad data. This situation can exist because the IrCC contains no LRC or CRC generator. In fact, there is no error checking facility available, without the frequency window generator feature in the receiver carrier frequency range detection circuit. Consequently, the received data error checking method in the CIR mode is whether the carrier frequency that is expected or programmed is the carrier frequency actually being received.

The Consumer Infrared Communications (CIR) included in the IrCC 20 of the present application is designed to accept carrier frequencies that are within a specified percentage of a programmed carrier frequency. The detection of an edge of the carrier frequency starts a process that generates and opens a frequency window 84 around the programmed frequency, as will be explained later. The next edge of the detected next cycle of the carrier frequency must fall within the frequency window 84, or the carrier frequency being received is out of the range of the frequency window 84 of frequencies around the programmed or expected frequency. The purpose of the frequency window generating process is to generate a frequency window having a range of frequencies around the programmed or expected frequency that defines the maximum percentage of allowable deviation for an incoming or received carrier frequency to vary from the programmed carrier frequency.

The receiver carrier frequency range detection circuit 22 including the frequency window generator 80 that opens the frequency window 84 is, in effect, the IrCC carrier frequency error checking facility when the IrCC is receiving data from a remote IR device, such as, for example, a TV, a VCR or a stereo. Therefore, if the data received has a carrier frequency that is unexpected and the carrier frequency of that data does not fall within the parameters of the frequency window generated, an error message is generated and the communication is aborted.

The frequency window generator portion of the carrier frequency range detection circuit of the present application comprises three (3) main components: (i) a carrier frequency divider 50; (ii) a programmable receive carrier divider 52; and (iii) a range sensitivity register 90 (see FIGS. 6, 10 and 12). As stated above, the carrier frequency divider 50 is eight (8) bits wide and is used to generate the programmed carrier frequency.

In one specific illustrative embodiment, the input clock is nominally 1.6 MHz, (48 MHZ/30). The programmable receive carrier divider will produce a clock based on the value in the range sensitivity register (see FIG. 10).

Figure 12:
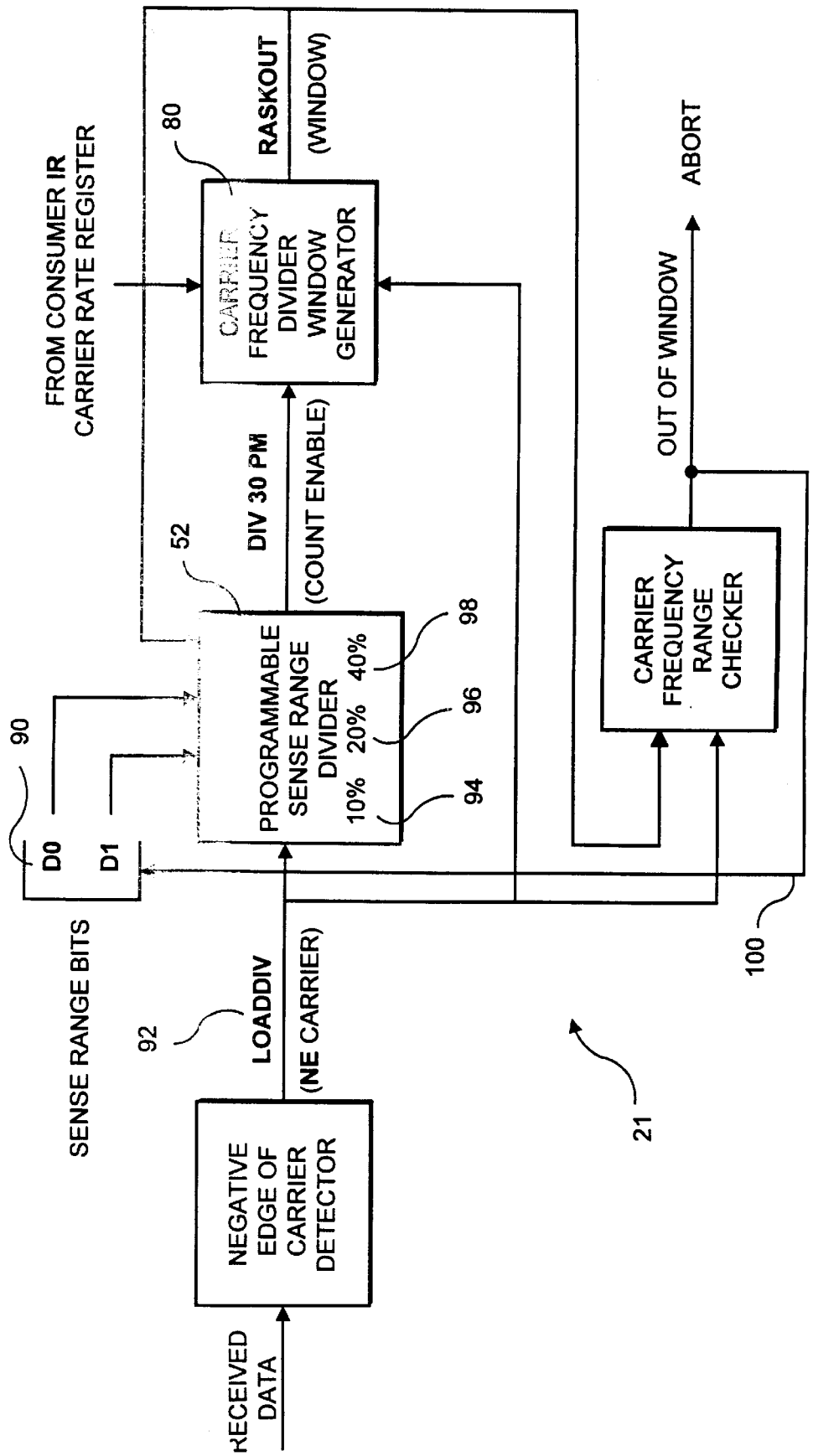
FIG. 12 is a functional block diagram of the window generator incorporated in the Infrared Communications Controller of the present application.

As shown in FIG. 12, in one specific representative embodiment of the present receiver carrier frequency range detection circuit, including the frequency window generator feature, once the LOADDIV signal 92 is sent to the programmable sense range divider 52, a signal from the sense range bits 90, FIGS. 10 and 12, determines whether the frequency window generated or opened will be a 10% 94, a 20% 96 or a 40% 98 frequency window. Normally, in the IR receive mode, the carrier frequency of the signal received would be divided by thirty (30), but when generating a 10% frequency window 94, the carrier frequency of the signal is actually divided by twenty-seven (27). At the end of twenty-seven (27) counts, the carrier frequency divider frequency window generator is enabled. At the count of twenty-seven (27), the number six (6) is loaded into the programmable sense-range divider, the frequency window is opened and six (6) counts later, see FIG. 13, the frequency window is closed. A selected edge of the carrier frequency of the data being received must be detected within those six (6) counts. If the selected edge received is outside the frequency window, the system aborts, i.e., the frequency window closes. The carrier frequency is active when the zero bit is being transmitted and the carrier frequency stops when the one bit is being transmitted.

It is important to note that the received data is sampled only to detect one edge of the carrier frequency of the data being received. If an edge of the carrier frequency is detected within the six (6) count frequency window, i.e., within the six (6) counts around the expected carrier frequency, then the system program continues processing the data and IR communications between the IrCC and the TV, VCR or stereo is established. If the edge is detected outside of the six (6) counts, the system program aborts and an error message is transmitted, as stated above.

In another specific example, for a range of plus or minus 20% 96 above or below the programmed carrier frequency or the expected carrier frequency, the programmable receiver carrier divider 52 will first divide the 48 MHZ by twenty four (24) see FIG. 13. The carrier frequency dividers end count occurs 20% sooner than normal and opens the frequency window. The opening or generation of the frequency window preloads a value of twelve (12) into the programmable receiver carrier divider. If an edge of the received data carrier frequency does not occur within the twelve (12) count frequency window, at the next end count the carrier frequency divider will close the frequency window. For example:

START WINDOW=−20%=24/30=80%;

END WINDOW=+20%=36/30=120%.

At this point, it should be clear that there are many options, such as, for example, programming a new expected carrier frequency or having the program redetermine the carrier frequency of the received data that was transmitted and used to establish IR communications between the PC and the remote TV, VCR or stereo via the IrCC. However, these steps usually require the use of scarce resources, such as the use of the PC's Central Processing Unit (CPU) chip, and are wasteful of valuable CPU processing time.

As shown in FIG. 12, other components of the PC determine, within a certain degree of accuracy, the carrier frequency of the signal being received from the remote TV, VCR or stereo. Specifically, these other components send the values to the CIR. Therefore, the CIR knows approximately what the bit rate and the carrier rate of the carrier frequency being received should be. However, the frequency window generator included in the circuit and method of the present invention provides for accommodating some error in that, if the carrier frequency or rate received is a little off from the carrier frequency or rate programmed or expected, by opening a frequency window around the programmed or expected carrier frequency or rate of six (6) counts, twelve (12) counts or twenty-four (24) counts.

As a further specific example, if the CIR 22 is expecting to receive a 1 MHZ carrier frequency signal and a 1.05 MHZ carrier frequency signal is received, a slight variation from the expected frequency, without the frequency window generator and the opening of the 10%, 20% or 40% frequency windows of the present invention, the 1.05 MHZ carrier frequency, being received would not be processed and the system would abort. With the receiver carrier frequency range detection circuit and method including the frequency window generation circuit and method of the present invention, recomputing and resampling the received data's carrier frequency by the CPU and/or the program before being transmitted to the CIR portion of the IrCC chip is avoided. The avoidance of these additional computations clearly saves computing time and calculating time while providing for the completion of efficient communications over the IR channel between the IrCC and the remote IR communications device.

Presently, it is preferred that a one time opportunity for the selected edge, presently preferably the negative edge, of the received carrier frequency to fall within one of a 10%, a 20% or a 40% frequency window be provided. If the selected edge of the carrier frequency of the received data is not detected when the frequency window is open, the system aborts and it is then left to the other components of the PC to determine the correct expected carrier frequency of the data.

However, it is possible to program the system such that, if a selected edge of the received data carrier frequency does not fall within the 10% frequency window, then, using a loopback feature 100, a 20% frequency window could be generated and opened. If the edge of the received data carrier frequency fell within the 20% frequency window, then IR communications would be established, as described above. However, if the edge of the received data carrier frequency did not fall within the 20% frequency window, then, again using another loopback feature 100, a 40% frequency window or a twenty-four (24) count frequency window would be generated and opened and, if the selected edge of the received data carrier frequency fell within that frequency window, IR communications would be established. As before, if at the end of the process of opening the 10%, the 20% and the 40% frequency window, no negative edge was detected, the process would abort, as explained above.

As one skilled in the art can readily determine, the circuit and methods described above could be utilized with any one or many combinations of the 10%, the 20% or the 40% frequency windows or other possible size frequency windows that might be programmed. Further, the first frequency window generated and opened could be a 20% frequency window followed by a 40% frequency window, or the only frequency window generated and opened could be the 40% frequency window, for example.

The receiver carrier frequency range detection feature of the present invention has been implemented in Standard Microsystems Corporation products, such as, for example, several products identified as FDC37C957FR, FDC37C93XFR, and FDC37C669FR. In these products, the innovative carrier frequency range detection feature provides ease of IR communications between a PC and a TV, a VCR or a stereo. Specifically, without the innovative carrier frequency range detection feature, communications between a PC and a TV, VCR or stereo would not be easily and efficiently established if the carrier frequency of the data received from the TV, VCR or stereo was not the exact same carrier frequency as that programmed or expected by the PC. Without the innovative frequency window generator feature of the present application, considerable CPU processing resources would be required in order to establish such IR communications with remote IR communications devices.

Thus, obviously the IrCC of the present invention has achieved all of the objects of the application by providing a new, improved, carrier frequency range detection circuit and method for an Infrared Communications Controller (IrCC) such that IR communications between a PC, having an IrCC, and a remote IR communications device is rapidly and accurately established; by providing a circuit and method that generates a frequency window around the frequency determined by the PC as received from the remote, TV, VCR or stereo; and by providing a circuit and method which uses detection of the same edge of the received carrier frequency from the remote IR communications device to effectively check the carrier frequency of the data being received from the remote IR communications device by the PC.

Changes and modifications in this specifically described embodiment can be carried out without departing from the scope of the invention that is intended to be limited only by the scope of the appended claims.

What is claimed is:

1. A receiver carrier frequency range detection circuit including a frequency window generator means for use with an IrCC comprising:

carrier frequency edge detection means;

carrier frequency divider means including a programmable sense range divider means, operatively connected to the edge detection means, for dividing a received carrier frequency; and a range sensitivity register, operatively connected to the programmable sense range divider means, for generating a range of frequencies around a programmed carrier frequency.

2. The circuit of claim 1 further including:

means for generating a ten percent (10%) frequency window on each side of the programmed frequency.

3. The circuit of claim 2 further including:

means for generating a twenty percent (20%) frequency window on each side of the programmed frequency.

4. The circuit of claim 3 further including:

means for generating a forty percent (40%) frequency window on each side of the programmed frequency.

5. The circuit of claim 1 further including:

means for generating a twenty percent (20%) frequency window on each side of the programmed frequency.

6. The circuit of claim 5 further including:

means for generating a forty percent (40%) frequency window on each side of the programmed frequency.

7. The circuit of claim 1 further including:

means for generating a forty percent (40%) frequency window on each side of the programmed frequency.

8. An infrared communications controller comprising:

UART means;

synchronous communications engine (SCE) means;

clock generator means;

a plurality of register means;

bus interface input/output means;

encoder/decoder means, for communicating with the clock generator means, the bus interface input/output means, the register means, and the SCE means, and an output multiplexer, operatively connected to the encoder/decoder means, for communication with an IR transducer module, a communications port and an auxiliary port, said encoder/decoder means including a receiver carrier frequency range detection circuit including a frequency window generator means, said frequency window generator means comprising:

a carrier frequency edge detection means;

a carrier frequency divider means including a programmable sense range divider means, operatively connected to said edge detection means, for dividing a received carrier frequency; and range sensitivity register, operatively connected to said programmable sense range divider means, for generating a range of frequencies around a programmed carrier frequency.

9. The infrared communications controller of claim 8 further including:

means for generating a ten percent (10%) frequency window on each side of the programmed frequency.

10. The infrared communications controller of claim 9 further including:

means for generating a twenty percent (20%) frequency window on each side of the programmed frequency.

11. The infrared communications controller of claim 10 further including:

means for generating a forty percent (40%) frequency window on each side of the programmed frequency.

12. The infrared communications controller of claim 8 further including:

means for generating a twenty percent (20%) frequency window on each side of the programmed frequency.

13. The infrared communications controller of claim 8 further including:

means for generating a forty percent (40%) frequency window on each side of the programmed frequency.

14. A method for determining whether a carrier frequency being received is the same as a programmed carrier frequency, the method comprising the steps of:

detecting an edge of the received carrier frequency;

generating a frequency window having a predetermined range of frequencies above and below the programmed frequency; and if the edge of the received carrier frequency falls within the predetermined range, processing the received carrier frequency.

15. The method of claim 14 further comprising the step of:

if the edge of the received carrier frequency falls outside the predetermined range, aborting the processing of the received carrier frequency.

16. A method for establishing communications between an infrared communications controller and a remote infrared communications device, the method comprising the steps of:

receiving data from the remote infrared communications device;

determining the approximate carrier frequency of the received data;

communicating the approximate carrier frequency of the received data to the infrared communications controller;

storing the approximate carrier frequency of the received data as a reference carrier frequency;

detecting an edge of the actual received carrier frequency;

generating a frequency window having a predetermined range of frequencies above and below the stored approximate carrier frequency; and if the edge of the received carrier frequency falls within the predetermined range of frequencies, processing the received data such that communications is established between the infrared communications controller and the remote infrared communications device.

17. The method of claim 16 comprising the step of:

if the edge of the received data carrier frequency falls outside the predetermined range, aborting communications.

18. A system for establishing communications between an infrared communications controller and a remote infrared communications device comprising:

means in the infrared communications controller, for receiving data from the remote infrared communications device;

means, operatively connected to said receiving data means, for approximating the carrier frequency of the received data;

means, operatively connected to said carrier frequency approximating means, for communicating the approximate carrier frequency of the received data;

means, operatively connected to said carrier frequency approximating means, for storing the approximate carrier frequency of the received data;

means, in the infrared communications controller, for detecting an edge of the actual received data carrier frequency;

means, operatively connected to said received data edge detecting means, for generating a frequency window having a predetermined range of frequencies above and below the approximate stored carrier frequency;

means, operatively connected to said received data edge detecting means, for determining if the edge of the received data carrier frequency falls within the predetermined range of frequencies; and means, operatively connected to said edge determining means, for processing the data received from the remote infrared communications device if the edge of the received data carrier frequency falls within the predetermined range of frequencies.

19. The system of claim 18, further comprising:

means, operatively connected to said edge determining means, for aborting the processing of data if the edge of the received data carrier frequency falls outside the predetermined range of frequencies.

* * * * *